(12) United States Patent
Luo et al.

(10) Patent No.: US 12,100,188 B2
(45) Date of Patent: Sep. 24, 2024

(54) TEMPLATE MARK DETECTION METHOD AND TEMPLATE POSITION CORRECTION METHOD BASED ON SINGLE CAMERA

(71) Applicant: THE INSTITUTE OF OPTICS AND ELECTRONICS, THE CHINESE ACADEMY OF SCIENCES, Sichuan (CN)

(72) Inventors: Xiangang Luo, Sichuan (CN); Chengwenli Li, Sichuan (CN); Minggang Liu, Sichuan (CN); Jian Yan, Sichuan (CN); Changtao Wang, Sichuan (CN)

(73) Assignee: THE INSTITUTE OF OPTICS AND ELECTRONICS, THE CHINESE ACADEMY OF SCIENCES, Sichuan (CN)

( * ) Notice: Subject to any disclaimer, the term of this patent is extended or adjusted under 35 U.S.C. 154(b) by 0 days.

(21) Appl. No.: 18/575,791

(22) PCT Filed: Dec. 27, 2022

(86) PCT No.: PCT/CN2022/142311
§ 371 (c)(1),
(2) Date: Dec. 29, 2023

(65) Prior Publication Data
US 2024/0273853 A1     Aug. 15, 2024

(30) Foreign Application Priority Data
Dec. 21, 2022    (CN) .......................... 202211651503.6

(51) Int. Cl.
*G06V 10/24*     (2022.01)
*G06T 7/62*     (2017.01)
(Continued)

(52) U.S. Cl.
CPC .............. *G06V 10/245* (2022.01); *G06T 7/62* (2017.01); *G06V 10/26* (2022.01); *G06V 10/443* (2022.01);
(Continued)

(58) Field of Classification Search
CPC ......... G06V 10/245; G06V 10/26; G06T 7/62
See application file for complete search history.

(56) References Cited

FOREIGN PATENT DOCUMENTS

| CN | 110458858 A | 11/2019 | |
|---|---|---|---|
| CN | 108921176 B | * 7/2020 | ........... G06K 9/4633 |

(Continued)

OTHER PUBLICATIONS

WIPO/ISA/CNIPA, International Search Report and Written Opinion issued on Aug. 18, 2023 in PCT/CN2022/142311, 7 pages.

*Primary Examiner* — Bobbak Safaipour
*Assistant Examiner* — Ashley L. Hytrek
(74) *Attorney, Agent, or Firm* — J. Peter Paredes; Amin Wasserman Gurnani LLP

(57) ABSTRACT

Provided are template mark detection method and template position correction method based on single camera, including: performing image collection on mark on template by single camera, and obtaining binary image after preprocessing; performing corner detection of jagged edges on binary image to obtain corner set of jagged edges; performing edge detection and line detection sequentially on binary image to obtain set of edge line segments from coarse detection; traversing such set, and judging and retaining collinear line segments, to obtain set of collinear line segments from coarse detection; traversing corner set of jagged edges, for point-line collinearity judgment with line segments in set of collinear line segments from coarse detection, to obtain set of point-line from fine detection; and performing linear fitting on set of point-line from fine detection, and calculat- (Continued)

ing an inclination angle of each straight line through an arctan function, thus completing detection of mark.

10 Claims, 13 Drawing Sheets

(51) Int. Cl.
  *G06V 10/26* (2022.01)
  *G06V 10/44* (2022.01)
(52) U.S. Cl.
  CPC .............. *G06T 2207/20061* (2013.01); *G06T 2207/20076* (2013.01)

(56) References Cited

FOREIGN PATENT DOCUMENTS

| | | | | |
|---|---|---|---|---|
| CN | 112258455 | A | * | 1/2021 |
| CN | 112258585 | A | | 1/2021 |
| CN | 112348837 | A | | 2/2021 |
| CN | 114543747 | A | * | 5/2022 |
| KR | 20090092906 | A | | 9/2009 |
| WO | 2022148192 | A1 | | 7/2022 |

* cited by examiner

TEMPLATE MARK DETECTION METHOD AND TEMPLATE POSITION CORRECTION METHOD BASED ON SINGLE CAMERA

CROSS-REFERENCE TO RELATED APPLICATIONS

The present application claims priority to PCT application serial no. PCT/CN2022/142311, which claims priority to the Chinese patent application with the filing No. 202211651503.6, filed on Dec. 21, 2022, the contents of which are incorporated by reference herein in their entireties.

TECHNICAL FIELD

The present disclosure relates to the technical field of optical detection, and in particular to a template mark detection method and a template position correction method based on a single camera.

BACKGROUND ART

A position needs to be corrected in a process of transmitting a template by a manipulator. Generally, two PSDs are used for optical correction or two cameras are used for image correction. However, in cases where spaces above and below a template chuck are limited, there is not enough space for installing the PSD or the camera. When an optical method is used for line detection on a position mark, since a single straight line has fixed slope and it is difficult to correct the slope thereof, line detection results in low mark slope accuracy. In addition, since pixel values of adjacent pixel points in a gray scale image have a small difference therebetween, the number of corners obtained from corner detection based on the gray scale image is small, and thus position information on the mark cannot be determined according to the obtained corners.

SUMMARY

(I) Technical Problem to be Solved

In view of the above problems, the present disclosure provides a template mark detection method and a template position correction method based on a single camera, for solving the technical problems in the conventional method, such as limited installation of a detection device and low inclination angle accuracy of a mark obtained.

(II) Technical Solution

In one aspect, the present disclosure provides a template mark detection method based on a single camera, including: S1, carrying out image collection on a mark on a template by a single camera, and obtaining a binary image after preprocessing; S2, carrying out corner detection of jagged edges on the binary image to obtain a corner set of jagged edges; S3, performing edge detection and line detection in sequence on the binary image to obtain a set of edge line segments from coarse detection; S4, traversing the set of edge line segments from coarse detection, and judging and retaining collinear line segments therein, to obtain a set of collinear line segments from coarse detection; S5, traversing the corner set of jagged edges, for point-line collinearity judgment with line segments in the set of collinear line segments from coarse detection, to obtain a set of point-line from fine detection; and S6, carrying out linear fitting on the set of point-line from fine detection, and calculating an inclination angle of each of the straight lines through an arctan function, thus completing detection of the mark.

Further, the S1 includes: S11, carrying out image collection on the mark on the template by a single camera, to obtain an initial image; S12, converting the initial image into a gray scale image and filtering the gray scale image; and S13, performing binarization processing on the image obtained in the S12, to obtain a binary image.

Further, the S2 includes: performing Shi-Tomasi corner response function detection on pixel points in the binary image, to obtain a corner set of jagged edges.

Further, the S3 includes: performing Canny edge detection on the binary image to obtain an edge pattern; and obtaining a plurality of edge line segments in the mark using Progressive Probabilistic Hough Transform according to the edge pattern, wherein the plurality of edge line segments form the set of edge line segments from coarse detection.

Further, the S4 includes: S41, arbitrarily selecting two line segments in the set of edge line segments from coarse detection, to obtain four endpoints; S42, calculating an area of a quadrangle formed by the four endpoints, and calculating slope of one of the line segments, and slope of line segments formed by connecting two endpoints of one line segment to two endpoints of the other line segment respectively; S43, if the area of the quadrangle is smaller than a first preset threshold and a difference value between the slope is smaller than a second preset threshold, the two line segments being collinear; and S44, traversing the set of edge line segments from coarse detection, and retaining collinear line segments therein, to obtain the set of collinear line segments from coarse detection.

Further, the S5 includes: S51, arbitrarily selecting a corner from the corner set of jagged edges, the corner forming triangles with the line segments in the set of collinear line segments from coarse detection respectively; S52, calculating areas of the triangles; S53, if the areas of the triangles are smaller than a third preset threshold, the corner being point-line collinear with the line segments; and S54, traversing the corner set of jagged edges, and merging point-line collinear corners and line segments to obtain a set of point-line from fine detection.

Further, the S5 further includes: S55, selecting the same collinear line segments in the set of point-line from fine detection, retaining any one thereof, and removing redundant line segments.

Further, the S6 includes: S61, carrying out linear fitting on a corner and two endpoints of a corresponding line segment in the set of point-line from fine detection to obtain a linear equation, the corner and the corresponding line segment being collinear; and S62, calculating an inclination angle of each of the straight lines through an arctan function according to the linear equation.

Further, the mark on the template includes one of a "*" shape and a cross shape.

In another aspect, the present disclosure provides a template position correction method based on a single camera, including: S1, carrying out image collection on a mark on a template by a single camera, and obtaining a binary image after preprocessing; S2, carrying out corner detection of jagged edges on the binary image to obtain a corner set of jagged edges; S3, performing edge detection and line detection in sequence on the binary image to obtain a set of edge line segments from coarse detection; S4, traversing the set of edge line segments from coarse detection, and judging and retaining collinear line segments therein, to obtain a set of collinear line segments from coarse detection; S5, traversing the corner set of jagged edges, for point-line collinearity judgment with line segments in the set of collinear line segments from coarse detection, to obtain a set of point-line from fine detection; S6, carrying out linear fitting on the set of point-line from fine detection, and calculating an inclination angle of each straight line through an arctan function; and S7, correcting a position of the template according to a difference value between the inclination angle of each straight line and a standard angle.

(III) Beneficial Effects

For the template mark detection method and the template position correction method based on a single camera in the present disclosure, the image collection is carried out by a single camera, which reduces station occupation, and solves the problem of limited installation of detection devices. Further, more and accurate edge corners are obtained through the image binarization, a more accurate linear inclination angle is obtained after performing the linear fitting in combination with collinear straight lines on two sides of communication part of the template mark, the accurate position information of the mark is determined, high-accuracy detection of the template mark is realized, and finally the template position is corrected according to the mark position information obtained by this detection method.

DETAILED DESCRIPTION OF EMBODIMENTS

In order to make objectives, technical solutions, and advantages of the present disclosure more clear, the present disclosure is further described in detail below with reference to embodiments and drawings.

The terms used in the present disclosure are merely for the purpose of describing the embodiments, and are not intended to limit the present disclosure. The terms "include", "contain", etc. used in the present disclosure indicate existence of the feature, step, operation, and/or component, but do not exclude existence or addition of one or more other features, steps, operations, or components.

It should be noted that if the embodiments in the present disclosure involve a directional indication, the directional indication is only used to explain a relative positional relationship and movement condition between various components in a particular posture. If the particular posture changes, the directional indication will also change accordingly.

The ordinals used in the description and the claims, such as "first", "second", and "third", are used to modify corresponding elements, while they themselves do not mean or represent any order of the elements, or represent sequence of one element with another, or sequence of a manufacturing method. These ordinals are only used to clearly distinguish an element with a certain name from another element with the same name.

Figure 1:
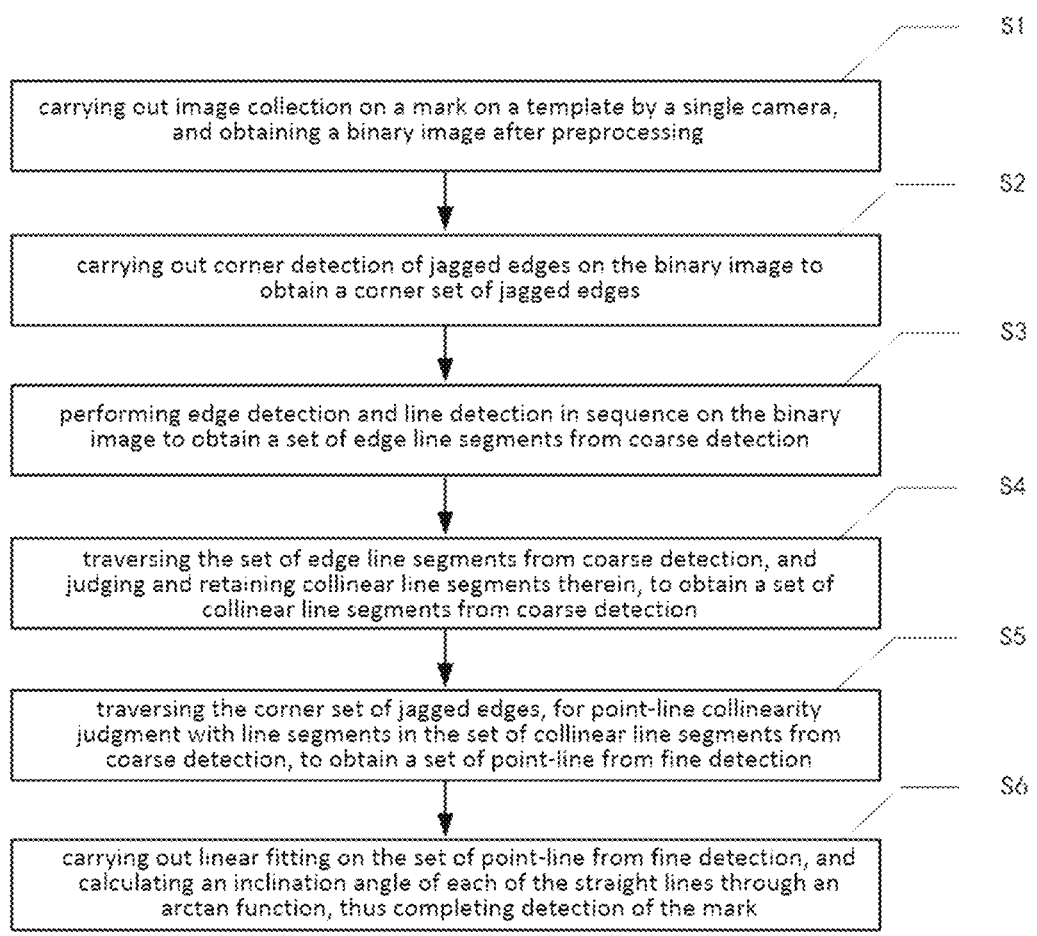
FIG. 1 schematically shows a flowchart of a template mark detection method based on a single camera according to embodiments of the present disclosure.

The present disclosure provides a template mark detection method based on a single camera. Referring to FIG. 1, the template mark detection method based on a single camera includes: S1, carrying out image collection on a mark on a template by a single camera, and obtaining a binary image after preprocessing; S2, carrying out corner detection of jagged edges on the binary image to obtain a corner set of jagged edges; S3, performing edge detection and line detection in sequence on the binary image to obtain a set of edge line segments from coarse detection; S4, traversing the set of edge line segments from coarse detection, and judging and retaining collinear line segments therein, to obtain a set of collinear line segments from coarse detection; S5, traversing the corner set of jagged edges, for point-line collinearity judgment with line segments in the set of collinear line segments from coarse detection, to obtain a set of point-line from fine detection; and S6, carrying out linear fitting on the set of point-line from fine detection, and calculating an inclination angle of each straight line through an arctan function, thus completing the detection of the mark.

Figure 2:
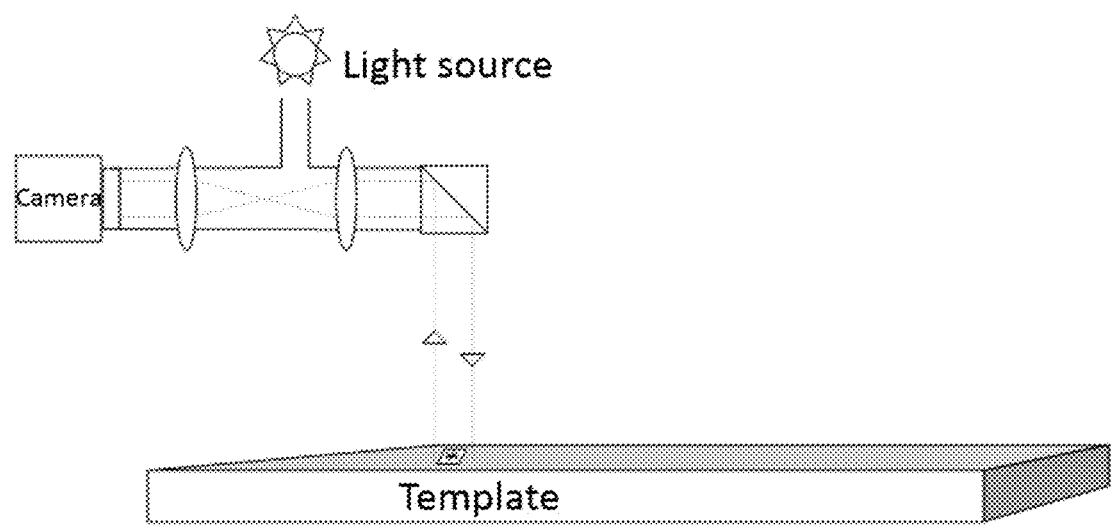
FIG. 2 schematically shows a structural schematic diagram of stations of devices used in the detection method according to embodiments of the present disclosure.

A schematic diagram of stations of devices used in the detection method is as shown in FIG. 2, including a light source, a lens group, and a CCD camera. A working process is as follows: a manipulator transmits a template to a template station below the CCD camera. Light emitted from the light source is transmitted by the lens group and then arrives at the mark on the template. Reflected light carrying mark information arrives at the CCD camera through the lens group. An image collected by the CCD camera is processed. In the present method, a single CCD camera is used to collect the image, thereby reducing station occupation, and solving the problem that the installation of detection devices is limited. Since a square clamping slot is around the template station, a rotation range and a movement range of the template in the square slot do not exceed 0.5° or ±0.5 mm. Within these ranges, the higher the positioning accuracy of a mark image collected by the single CCD camera is, the higher the position accuracy after subsequent correction of template position correspondingly is.

Specifically, the image collected is first preprocessed and binarized; and edge jags are generated after the image binarization, which characteristic just can allow obtaining more and accurate edge jag corners in the corner detection. Then the corner detection of jagged edges and the line detection are carried out in parallel (i.e., processings in step S2 and step S3 can be performed in synchronization or not, and the two steps are not ranked). Collinearity detection is performed on coarse detection edge line segments obtained, and two or more collinear line segments are retained, to obtain a set of collinear line segments from coarse detection. Then, the corner set of jagged edges is traversed, point-line collinearity judgement is performed in the set of collinear line segments from coarse detection, and collinear edge jag corners are retained, to obtain a set of point-line from fine detection. Finally, linear fitting and inverse trigonometric function operation are carried out on the set of point-line from fine detection to obtain a more accurate linear inclination angle. According to the above processing procedure, high-accuracy detection of the template mark can be realized. That is, in the present disclosure, more and accurate edge corners are obtained through the image binarization, and a more accurate linear inclination angle is obtained after linear fitting is performed with collinear straight lines on two sides of communication part of the template mark, then more accurate position information on the mark is obtained.

On the basis of the above embodiments, S1 includes: S11, carrying out image collection on the mark on the template by a single camera, to obtain an initial image; S12, converting the initial image into a gray scale image and filtering the gray scale image; and S13, performing binarization processing on the image obtained in S12, to obtain a binary image.

Figure 3:
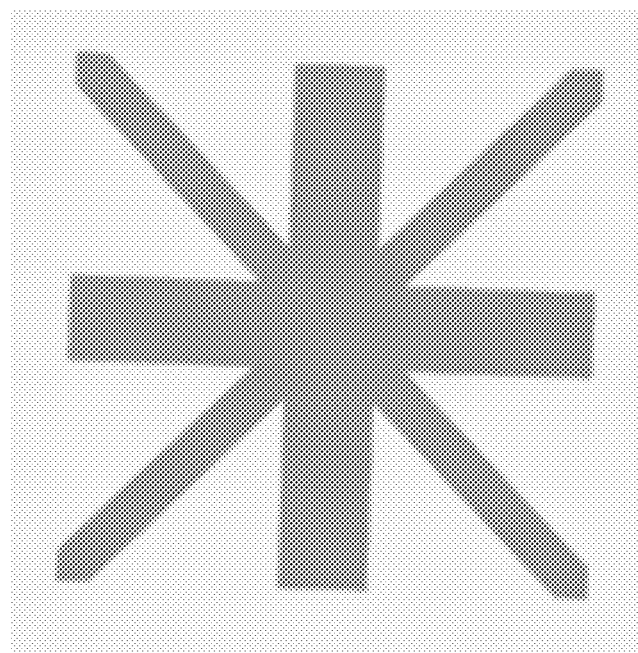
FIG. 3 schematically shows a pattern after a mark image is filtered according to embodiments of the present disclosure.

The CCD camera collects the image of the mark on the template to obtain the initial image. The initial image is converted into the gray scale image which is then filtered. A size of a filtering block is variable. Result is as shown in FIG. 3 (taking a mark of "*" shape as an example). The filtering herein is due to the fact that an image edge is vulnerable to noise, and the image needs to be filtered to remove the noise in order to avoid detection of erroneous edge information. The filtering aims at smoothing some non-edge areas with weaker textures so as to obtain more accurate edges.

Figure 4:
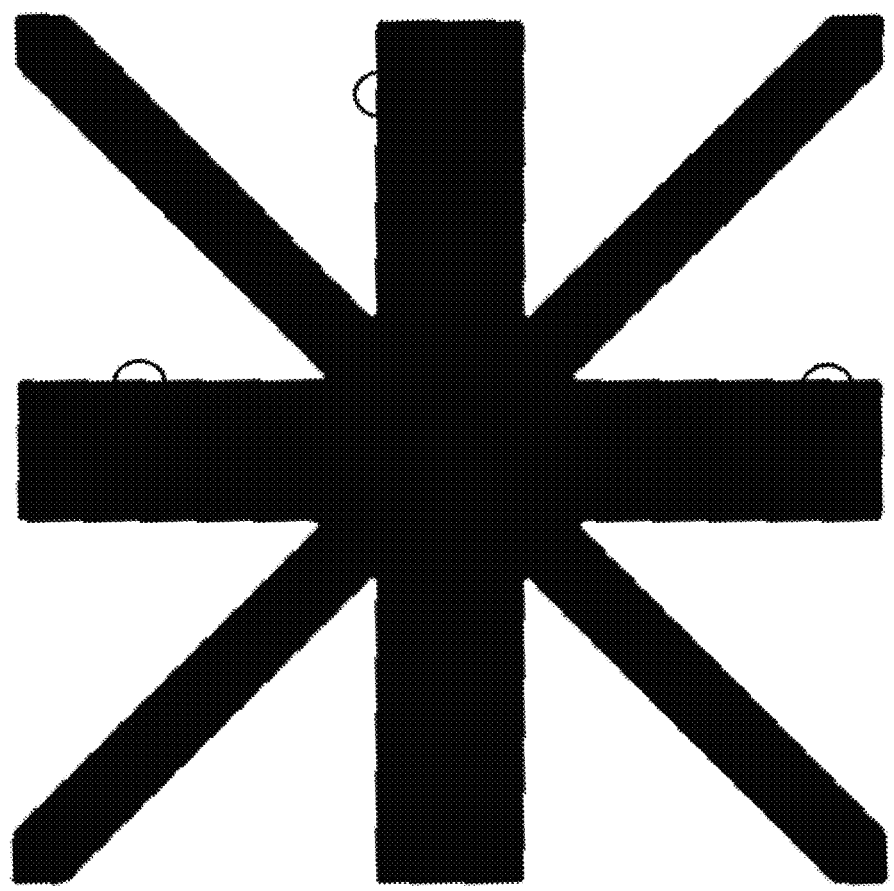
FIG. 4 schematically shows a pattern after binarization processing is performed on a gray scale image according to embodiments of the present disclosure.

Then all pixel points in the gray scale image are traversed to calculate a pixel median value of the gray scale image, and all the pixel values are binarized according to the pixel median value. For example, pixel values smaller than the median value are assigned with 255, and pixel values greater than the median value are assigned with 0. Of course, other values can also be assigned, but the two values selected need to have a large enough difference, so as to distinguish the image from a blank area. Generally, the image binarization is to set a gray value of a pixel point on an image to 0 or 255. Result is shown in FIG. 4. As can be seen from the figure, a plurality of jags, as shown by circled portions in FIG. 4, are generated at an edge of an aligned mark pattern having undergone the binarization.

On the basis of the above embodiment, S2 includes: performing Shi-Tomasi corner response function detection on pixel points in the binary image, to obtain a corner set of jagged edges.

Figure 5:
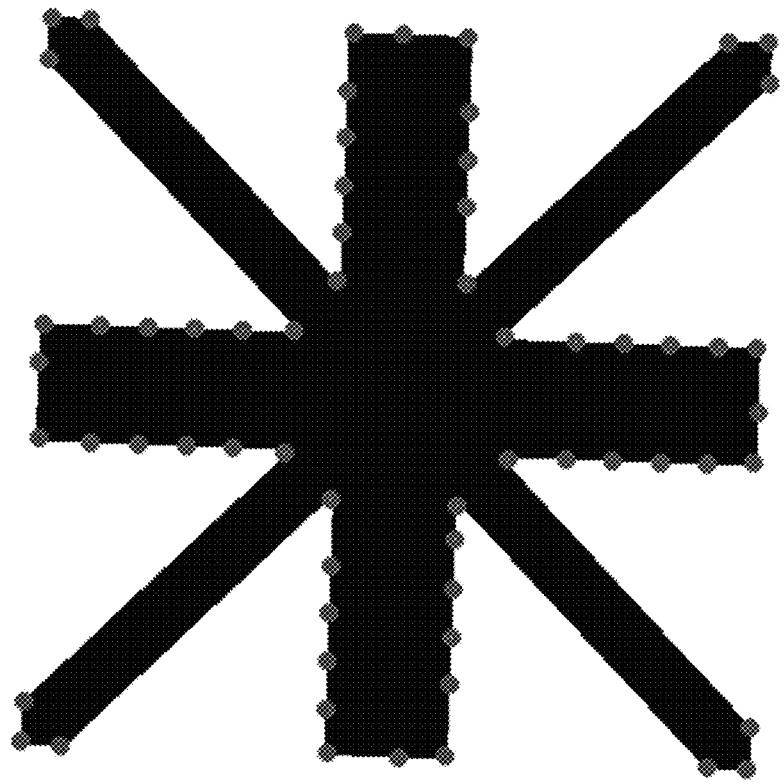
FIG. 5 schematically shows a diagram of a result of corner detection of jagged edges carried out on a binary image according to embodiments of the present disclosure.

The corner detection of jagged edges is carried out on the binary image, to acquire Shi-Tomasi corner detection data of the image, and acquire a corner set of jagged edges $\{sp_1, sp_2, sp_3, \ldots sp_m\}$ of the image. A result of the corner detection of jagged edges is as shown in FIG. 5. A quality level in the Shi-Tomasi corner response function is as small as possible in order to obtain enough points.

On the basis of the above embodiments, S3 includes: performing Canny edge detection on the binary image to obtain an edge pattern; and obtaining a plurality of edge line segments in the mark using Progressive Probabilistic Hough Transform according to the edge pattern, wherein the plurality of edge line segments form the set of edge line segments from coarse detection.

The edge detection is performed on the binary image by a conventional Canny edge detection algorithm. A selection theory of specific values in the Canny edge detection algorithm is as follows: in a process of obtaining the edge, some virtual edges may be obtained, which may be generated by a real image, and may also be generated by noise, and virtual edges generated by the noise need to be removed. An attribute of a current edge is judged according to a relationship between a gradient value of a current edge pixel and two thresholds. If a pixel gradient value of the current edge is greater than or equal to a second edge threshold, the current edge pixel is marked as a strong edge, i.e., this edge is generated by the real image. If the pixel gradient value of the current edge is between the second edge threshold and a first edge threshold, the current edge pixel is marked as a virtual edge (it still needs to be retained at this time). If the pixel gradient value of the current edge is less than or equal to the first edge threshold, the current edge is discarded. After the virtual edge is obtained through the above processing, whether this virtual edge is generated by the real image or noise is determined by judging whether the virtual edge is connected to the strong edge. If the virtual edge is connected to the strong edge, the virtual edge is generated by the real image; and if the virtual edge is not connected to the strong edge, the virtual edge is caused by noise. In the above, specific values of the first edge threshold and the second edge threshold can be selected as required.

Figure 6:
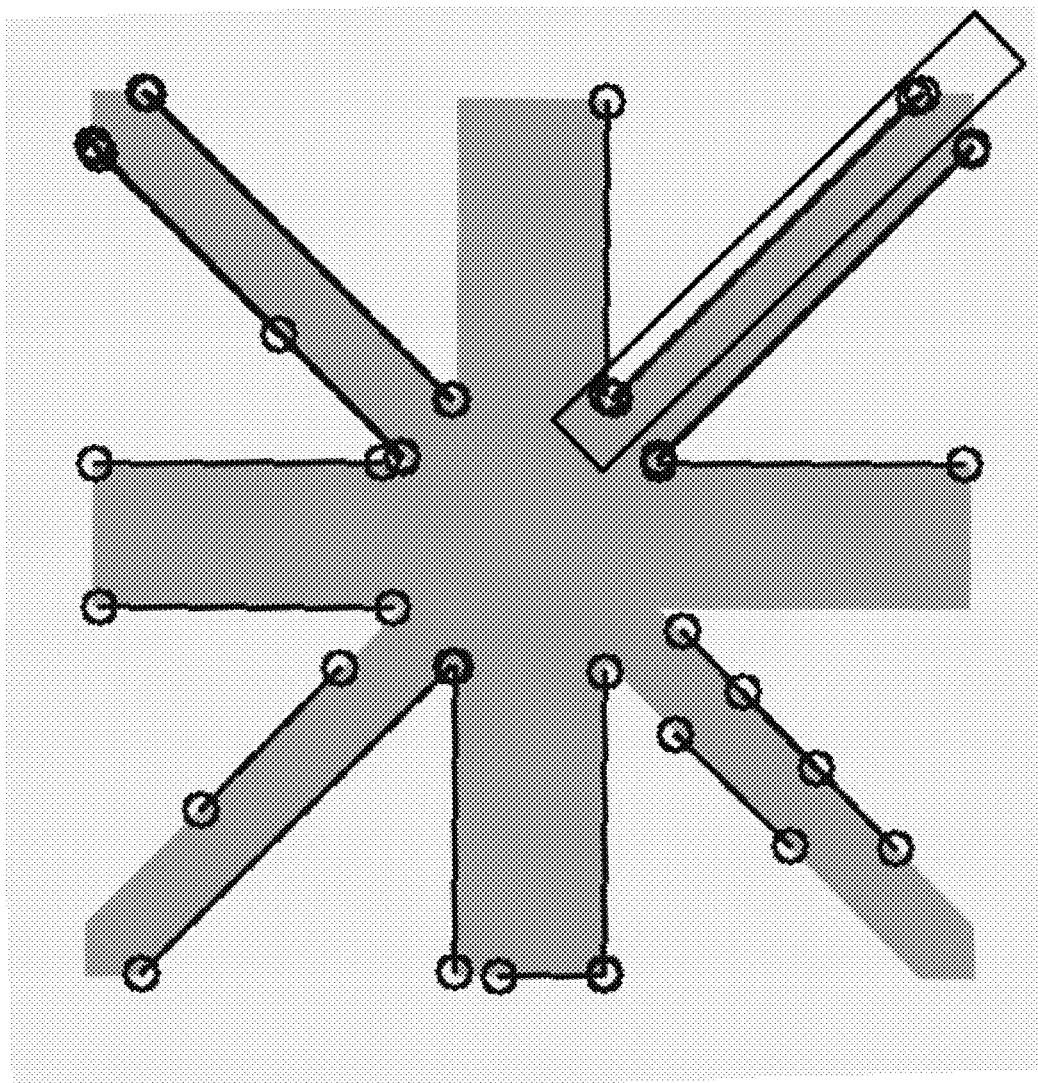
FIG. 6 schematically shows a diagram of a result of edge detection and line detection on a binary image according to embodiments of the present disclosure.

Line detection can be performed on the image having undergone the Canny edge detection by the conventional Progressive Probabilistic Hough Transform, and an edge line segment in an mark is obtained according to the edge pattern (the edge pattern may have a curved portion) obtained through the Canny edge detection. After the line detection, a set of edge line segments from coarse detection $\{d_1, d_2, d_3, \ldots, d_n\}$ is obtained. A detection result of the coarse detection edge line segments is as shown in FIG. 6. As can be seen from a box part in FIG. 6, a plurality of edge line segments may be detected at the same position after the Progressive Probabilistic Hough Transform.

On the basis of the above embodiments, S4 includes: S41, arbitrarily selecting two line segments in the set of edge line segments from coarse detection, to obtain four endpoints; S42, calculating an area of a quadrangle formed by the four endpoints, and calculating slope of one of the line segments and slope of line segments formed by connecting two endpoints of one line segment to two endpoints of the other line segment respectively; S43, if the area of the quadrangle is smaller than a first preset threshold and a difference value between the slope is smaller than a second preset threshold, the two line segments being collinear; and S44, traversing the set of edge line segments from coarse detection, and retaining collinear line segments therein, to obtain the set of collinear line segments from coarse detection.

The line segments in the obtained set of edge line segments from coarse detection $\{d_1, d_2, d_3, \ldots, d_n\}$ are traversed, and the collinear line segments are merged. "Merge" herein refers to merging the collinear line segments into the set of collinear line segments from coarse detection, while temporarily not performing de-duplication on the collinear line segments, to obtain the set of collinear line segments from coarse detection $\{cl_1, cl_2, cl_3, \ldots cl_k\}$, i.e., each element in the set of collinear line segments from coarse detection is a set of collinear line segments.

There are many methods for judging collinearity. A collinearity judgment process in the present disclosure is described below. Two line segments are arbitrarily selected from the set of edge line segments from coarse detection $\{d_1, d_2, d_3, \ldots, d_n\}$. It is known that endpoints of the two line segments are $(P_1, P_2)$ and $(P_3, P_4)$ respectively, the collinearity judgment conditions are $\Psi_1$ and $\Psi_2$, and two line segments are determined collinear when the two conditions are satisfied.

$\Psi_1$ is whether an area of a quadrangle formed by the four endpoints is smaller than the first preset threshold. In the present disclosure, an area of a triangle is directly calculated through lengths of three sides of the triangle according to Heron's formula. The area of the quadrangle is equal to a sum of the areas of the two triangles, as shown in the following formula (1):

$$\begin{cases} S_1 = \sqrt{h_1(h_1 - L_{P_1P_2})(h_1 - L_{P_1P_3})(h_1 - L_{P_2P_3})} \\ S_2 = \sqrt{h_2(h_2 - L_{P_3P_4})(h_2 - L_{P_4P_2})(h_2 - L_{P_2P_3})} \\ S_1 + S_2 < \eta \end{cases} \quad (1)$$

where $S_1$ represents area of triangle $P_1P_2P_3$, $h_1$ is half perimeter of the triangle $P_1P_2P_3$, $L_{P_iP_j}$ represents length of a line segment between points $P_i$ and $P_j$, $S_2$ represents area of triangle $P_2P_3P_4$, $h_2$ is half perimeter of triangle $P_2P_3P_4$, n is the first preset threshold, for example, $\eta=400$; and formulas for calculating $h_1$, $h_2$, and $L_{P_iP_j}$ are as shown in the following formula (2) and formula (3):

$$\begin{cases} h_1 = \frac{L_{P_1P_2} + L_{P_1P_3} + L_{P_2P_3}}{2} \\ h_2 = \frac{L_{P_3P_4} + L_{P_4P_2} + L_{P_2P_3}}{2} \end{cases} \quad (2)$$

$$L_{P_iP_j} = \sqrt{(P_i \cdot x - P_j \cdot x)^2 + (P_i \cdot y - P_j \cdot y)^2} \quad (3)$$

Figure 7:
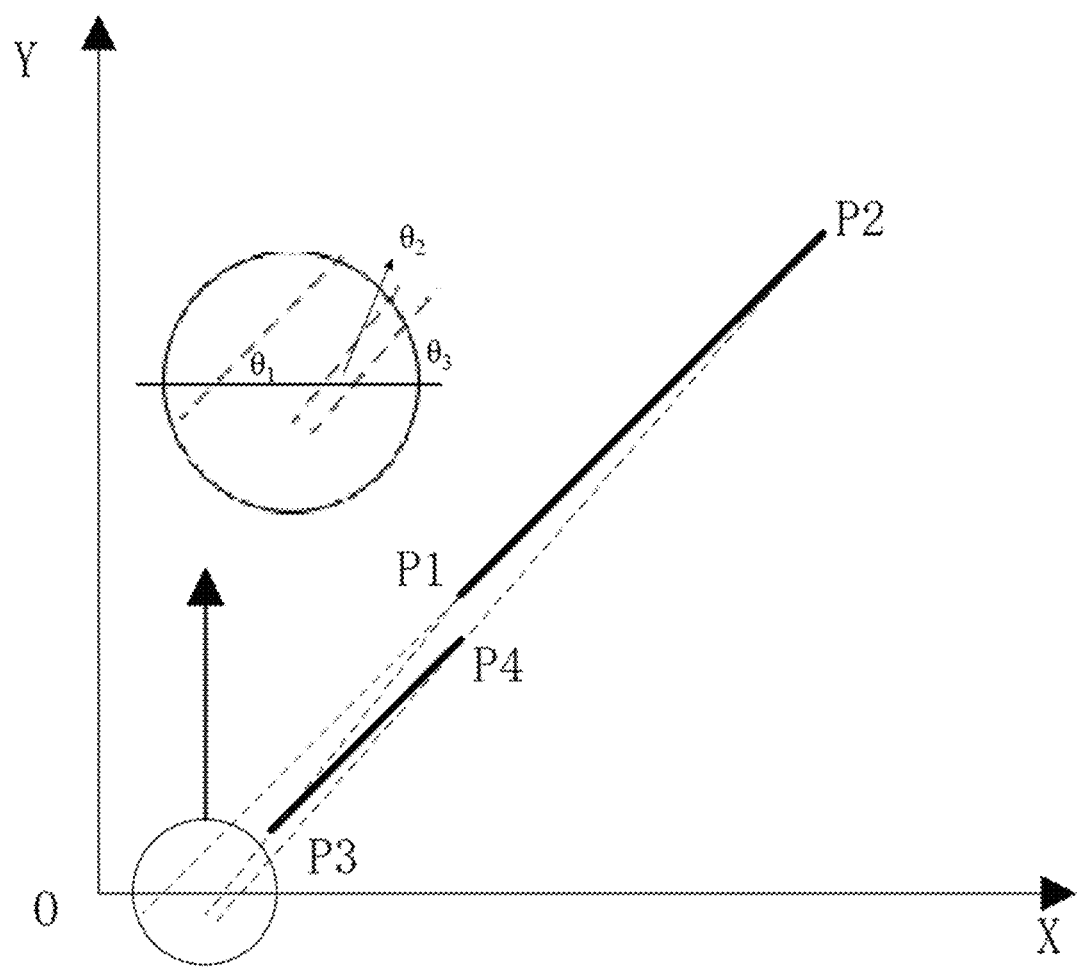
FIG. 7 schematically shows a schematic diagram of an included angle for collinearity judgment according to embodiments of the present disclosure.

$\Psi_2$ is whether slope of one line segment, and difference value of the slope of line segments formed by connecting two endpoints of one line segment and two endpoints of the other line segment respectively are smaller than the second preset threshold. For ease of description, the slope is converted into an included angle between a line segment and an x-axis for display in the present disclosure. Through the arctan function, the slope can be converted into an included angle $\theta_1$ between a straight line where the endpoint $P_1$ and the endpoint $P_2$ are located and the x-axis; an included angle $\theta_2$ between a straight line where the endpoint $P_1$ and the endpoint $P_3$ are located and the x-axis; and an included angle $\theta_3$ between a straight line where the endpoint $P_2$ and the endpoint $P_4$ are located and the x-axis, as shown in FIG. 7. All inclination angles are in radian, as shown in the following formula (4):

$$\begin{cases} |\theta_1 - \theta_2| < \delta \\ |\theta_1 - \theta_3| < \delta \end{cases} \quad (4)$$

In the above, for example, the second preset threshold is $\delta=0.16$, calculation formulas of the inclination angles $\theta_1$, $\theta_2$, and $\theta_3$ are as shown in the following formula (5):

$$\begin{cases} \theta_1 = Math.A\tan2(P_1 \cdot y - P_2 \cdot y, P_1 \cdot x - P_2 \cdot x) \\ \theta_2 = Math.A\tan2(P_1 \cdot y - P_3 \cdot y, P_1 \cdot x - P_3 \cdot x) \\ \theta_3 = Math.A\tan2(P_2 \cdot y - P_4 \cdot y, P_2 \cdot x - P_4 \cdot x) \end{cases} \quad (5)$$

On the basis of the above embodiments, S5 includes: S51, arbitrarily selecting a corner from the corner set of jagged edges, the corner forming triangles with the line segments in the set of collinear line segments from coarse detection respectively; S52, calculating areas of the triangles; S53, if the areas of the triangles are smaller than a third preset threshold, the corner being point-line collinear with the line segments; and S54, traversing the corner set of jagged edges, and merging the point-line collinear corners and line segments to obtain a set of point-line from fine detection.

The corner set of jagged edges is traversed, point-line collinearity judgment is performed in the set of collinear line segments from coarse detection, and collinear corners and line segments are merged into the same set of collinear line segments from coarse detection, to obtain a set of point-line from fine detection $\{fl_1, fl_2, fl_3, \ldots fl_k\}$.

In the above, a condition for judging the point-line collinearity is $\Psi_3$. $\Psi_3$ is whether an area of a triangle formed by a corner $sp_k$ and two endpoints $(P_i, P_j)$ of a line segment in the set of collinear line segments from coarse detection is smaller than the third preset threshold. For example, the third preset threshold is $\eta_s=300$, and a calculation method of $\Psi_3$ is the same as the formula for calculating the area of the triangle in $\Psi_1$.

On the basis of the above embodiments, S5 further includes: S55, selecting the same collinear line segments in the set of point-line from fine detection, retaining any one thereof, and removing redundant line segments.

In this case, redundant segments of the same collinear line segments in the set of point-line from fine detection further may be removed, and only one line segment in each group of the same collinear line segments is retained. As shown by the box part in FIG. 6, there may be a plurality of line segments close to each other at the same position, and after the collinearity judgment in step S54 is performed on these line segments or with other line segments, two line segments with the same slope may be obtained, and both of these two line segments are saved in the set of collinear line segments from coarse detection in step S4. In order to remove redundant data, redundant coarse detection line segments containing the same single coarse detection collinear line segment are removed by calculating a union of the line segments in this step.

On the basis of the above embodiments, S6 includes: S61, carrying out linear fitting on a corner and two endpoints of a corresponding line segment in the set of point-line from fine detection to obtain a linear equation, the corner and the corresponding line segment being collinear; and S62, calculating an inclination angle of each straight line through the arctan function according to the linear equation.

Figure 8:
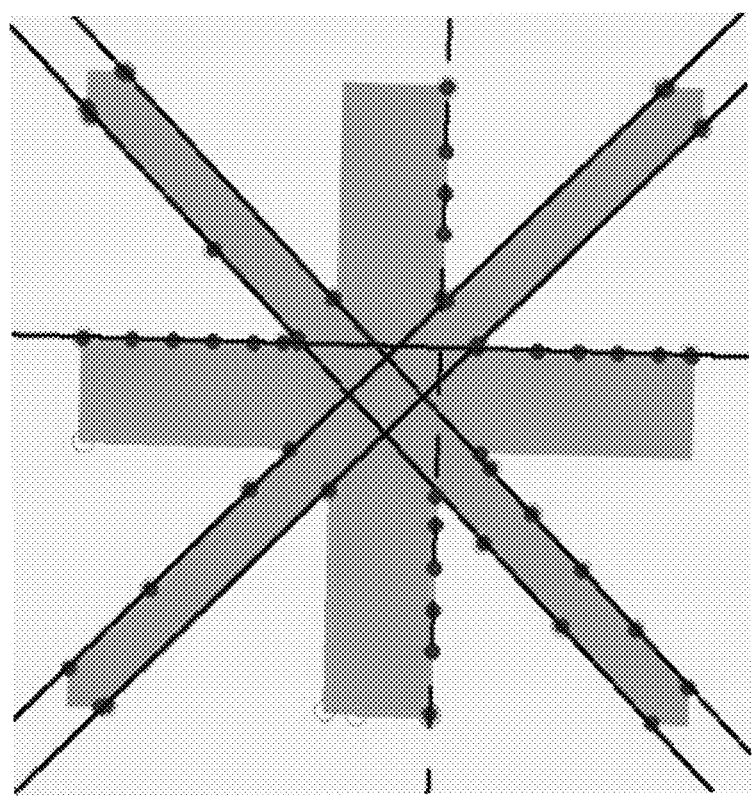
FIG. 8 schematically shows a diagram of a result of linear fitting carried out on a set of point-line from fine detection according to embodiments of the present disclosure.

The linear fitting is performed on the corner and the corresponding line segment which are collinear in the fine detection point-line collinear set, for example, the linear fitting is performed using a least square method. Since a line segment may be represented by two endpoints thereof, the number of all points in the set of point-line from fine detection is N, an equation being as shown in the following formula (6). A fine detection point-line fitting result is as shown in FIG. 8, and a linear equation like y=ax+b is obtained. An accurate linear inclination angle ß is obtained after the arctan function calculation, as shown in formula (7).

$$\begin{bmatrix} N & \sum_{i=1}^{N} x_i \\ \sum_{i=1}^{N} x_i & \sum_{i=1}^{N} x_i^2 \end{bmatrix} \begin{bmatrix} b \\ a \end{bmatrix} = \begin{bmatrix} \sum_{i=1}^{N} y_i \\ \sum_{i=1}^{N} x_i y_i \end{bmatrix} \quad (6)$$

$$\beta = \frac{180}{\pi} \tan^{-1} a \quad (7)$$

On the basis of the above technical solutions, a detection deviation of the detection method can be calculated. S8 includes: S81, obtaining detection errors of various straight lines by subtracting a standard deflection angle of various straight lines from a deflection angle; S82, obtaining a deflection error of template transmission by averaging the detection errors; and S83, estimating a detection accuracy deviation of this method according to a standard deviation and an average value of the deflection errors corresponding to a plurality of standard deflection angles.

When the template is loaded by a manipulator, the mark on the template is offset from a standard position by a certain angle, and this offset angle is taken as the standard deflection angle. The deflection angles of various straight lines are obtained by subtracting the inclination angles of various straight lines from the standard angle, therefore, the detection error=the standard deflection angle—the deflection angle of the straight line, and the deflection error is obtained by averaging the detection errors. The detection deviation of this method can be estimated according to the standard deviation and the average value of the deflection errors corresponding to the plurality of standard deflection angles.

$$\bar{\delta} = \frac{\sum_{i=1}^{m} (\theta_{standard} - \beta_{deviation})}{m} \quad (8)$$

In the above, $\bar{\delta}$ is the deflection error, m is the number of set of point-line from fine detections of each image, $\theta_{standard}$ is a rotation angle of the manipulator as the standard deflection angle, and $\beta_{deviation}$ is the deflection angle of the straight line obtained by subtracting the inclination angle of each straight line from the standard angle.

On the basis of the above embodiments, the mark on the template includes one of a "*" shape and a cross shape.

The detection method of the present disclosure is applicable not only to "*" shape marks, but also to cross shape marks. The detection method of the present disclosure can be used to detect a template mark as long as the mark is formed by intersecting straight lines without curves.

The present disclosure further provides a template position correction method based on a single camera, including: S1, carrying out image collection on a mark on a template by a single camera, and obtaining a binary image after preprocessing; S2, carrying out corner detection of jagged edges on the binary image to obtain a corner set of jagged edges; S3, performing edge detection and line detection in sequence on the binary image to obtain a set of edge line segments from coarse detection; S4, traversing the set of edge line segments from coarse detection, and judging and retaining collinear line segments therein, to obtain a set of collinear line segments from coarse detection; S5, traversing the corner set of jagged edges, for point-line collinearity judgment with line segments in the set of collinear line segments from coarse detection, to obtain a set of point-line from fine detection; S6, carrying out linear fitting on the set of point-line from fine detection, and calculating an inclination angle of each straight line through an arctan function; and S7, correcting a position of the template according to a difference value between the inclination angle of each straight line and the standard angle.

According to the above mark detection method S1~S6, and further according to the difference value between the inclination angle obtained from the mark detection and the standard angle, the position of the template is corrected more accurately.

In the present disclosure, more accurate slope can be obtained from collinear straight lines on two sides of communication part according to the characteristic of an aligned mark. Corner information obtained from corner detection based on the gray scale image is less, while the edge jags will be generated after the image binarization, which characteristic just can render more and accurate edge corners in the corner detection. In the present disclosure, deflection error of a terminal transmission position is detected through a combination of double lines and the edge jag corners, thus the error detection accuracy is high.

Hereinafter, the present disclosure is further described with reference to embodiments. The above template mark detection method and template position correction method based on a single camera are specifically described in the following embodiments. However, the following embodiments are merely illustrative of the present disclosure, while the scope of the present disclosure is not limited thereto.

Figure 9:
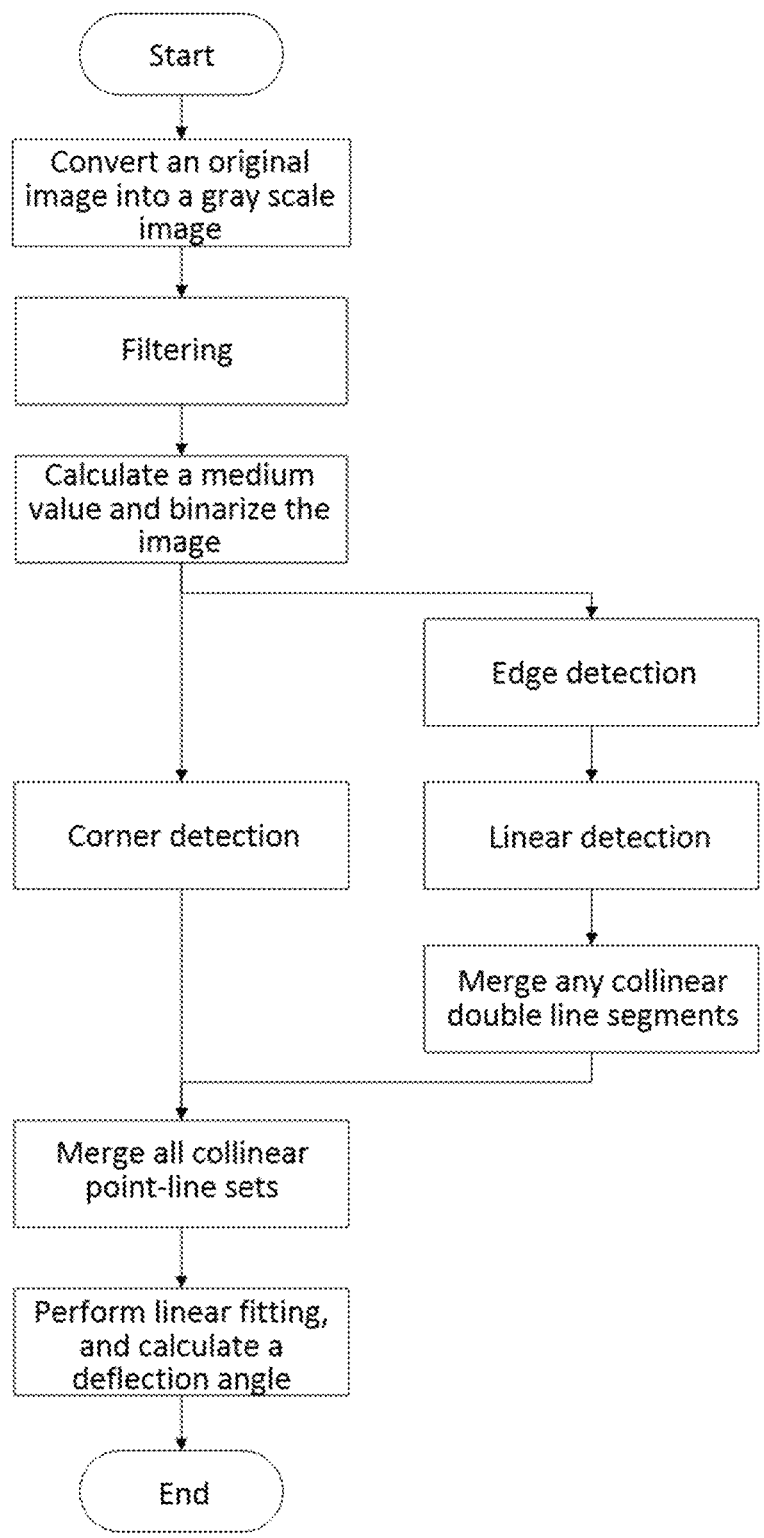
FIG. 9 schematically shows a schematic diagram of a processing flow of template mark detection based on a single camera according to embodiments of the present disclosure.

The template mark detection method and template position correction method based on a single camera in the present disclosure, as shown in FIG. 9, include following steps executed in sequence.

Step 1: carrying out image collection by a single CCD camera, to obtain an original image (initial image); converting the collected original image into a gray scale image, and filtering and binarizing the gray scale image, to obtain a binary image. Step 1 is equivalent to the above step S1.

Step 2: carrying out corner detection of jagged edges on the binary image to acquire corner detection data of the image, and obtain a corner set of jagged edges {$sp_1$, $sp_2$, $sp_3$, ... $sp_m$} of the image. Step 2 is equivalent to the above step S2.

Step 3: performing edge detection on the binary image; and performing line detection on the image having undergone the edge detection, to obtain a set of edge line segments from coarse detection {$d_1$, $d_2$, $d_3$, ..., $d_n$}. Step 3 is equivalent to the above step S3.

Step 4: traversing the line segments in the set of edge line segments from coarse detection {$d_1$, $d_2$, $d_3$, ..., $d_n$}, and merging collinear line segments into a set of collinear line segments from coarse detection, to obtain a set of collinear line segments from coarse detection {$cl_1$, $cl_2$, $cl_3$, ... $cl_k$}. Step 4 is equivalent to the above step S4.

Step 5: traversing the corner set of jagged edges, for point-line collinearity judgment in the set of collinear line segments from coarse detection, and merging the corners and line segments which are collinear into the same set of collinear line segments from coarse detection, to obtain a set of point-line from fine detection $\{fl_1, fl_2, fl_3, \ldots fl_k\}$. Step 5 is equivalent to the above step S5.

Step 6: carrying out linear fitting and inverse trigonometric function operation on the set of point-line from fine detection, to obtain a more accurate inclination angle of each straight line in the template mark. Step 6 is equivalent to the above step S6.

Step 7: correcting a position of the template according to a difference value between the inclination angle of each straight line and a standard angle. Step 7 is equivalent to the above step S7.

According to the above step 1 to step 7, an embodiment is provided below.

Embodiment 1

Implementation steps of a template mark detection method based on a single camera according to the present embodiment are as follows.

Step 11: a mark on a template was in a ".*-" shape. The template was loaded five times, and the mark of the template pattern was detected five times respectively. An initial image collected by a single CCD camera was converted into a gray scale image and Blur filtering was performed on the gray scale image, wherein a size of a filtering block was variable. In the present embodiment, 5*5 pixels were used for filtering, and filtering blocks with 3*3 and 7*7 pixels were also tried. Result shows that accuracy of an inclination angle of a straight line of the mark obtained from the detection is reduced, but a relatively accurate inclination angle of the straight line of the mark still can be finally obtained.

Figure 10:
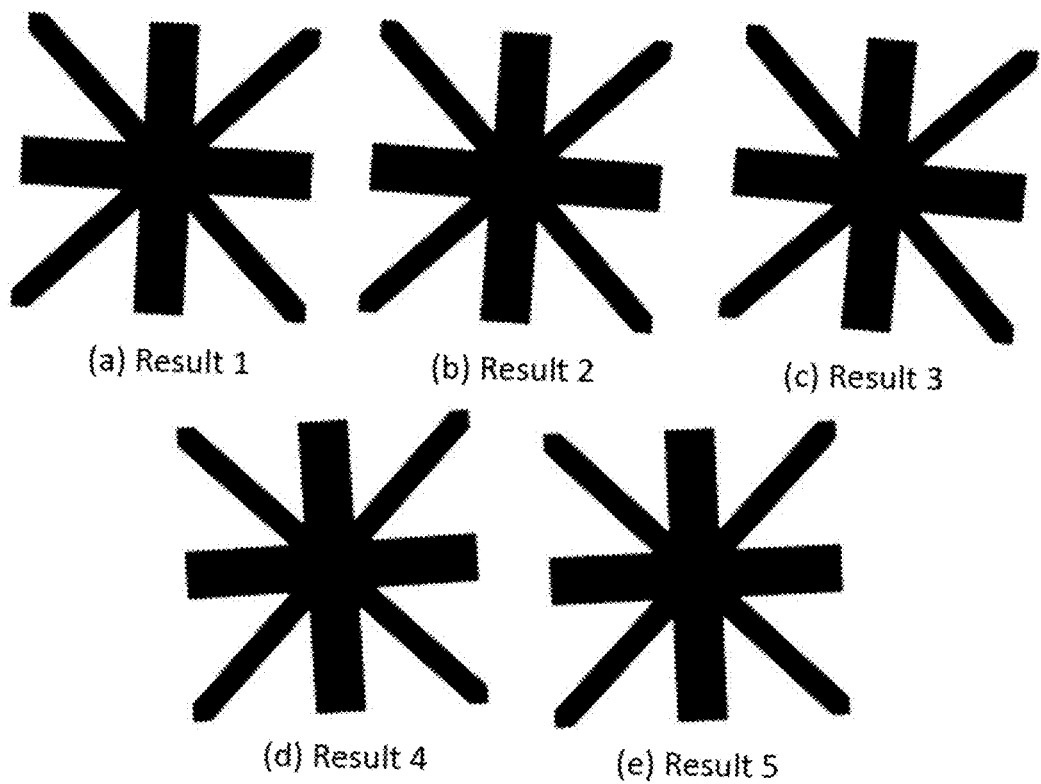
FIG. 10 schematically shows a diagram of results of binarization processing after loading a template five times according to Embodiment 1 of the present disclosure.

Step 12: all pixel points in the image were traversed to calculate a pixel median value of the gray scale image. All the pixel values were binarized according to the pixel median value, to obtain a binary image. In the present embodiment, pixel values smaller than the median value were assigned with 255, and pixel values greater than the median value were assigned with 0. (0 is black, and 255 is white in opencv). Results are as shown in FIG. 10. In FIG. 10, (a)~(e) are respectively corresponding to results of the binarization process after loading the template five times. As can be seen from FIG. 10, a plurality of jags are generated on edges of aligned mark patterns after the binarization processing.

Figure 11:
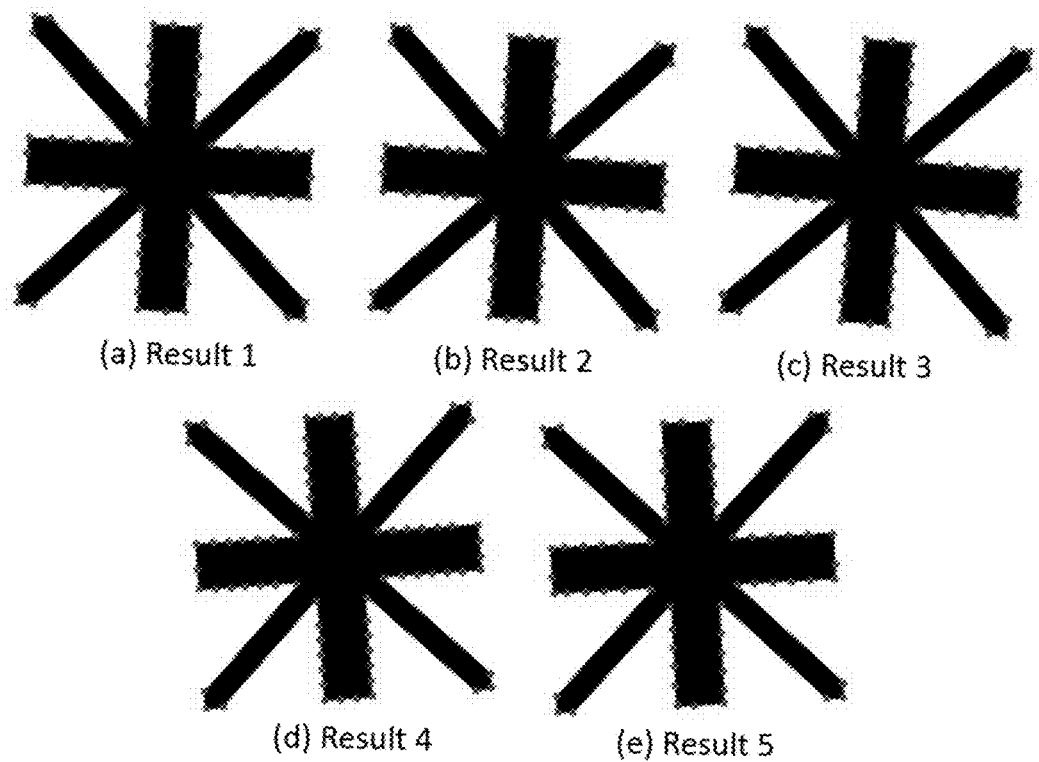
FIG. 11 schematically shows a diagram of results of corner detection of jagged edges performed on binary images after loading the template five times according to Embodiment 1 of the present disclosure.

Step 13: corner detection of jagged edges was carried out on the binary image, to acquire Shi-Tomasi corner detection data of the image, and obtain a corner set of jagged edges $\{sp_1, sp_2, sp_3, \ldots sp_m\}$. A result of the corner detection of jagged edges is as shown in FIG. 11. In FIG. 11, (a) to (c) are respectively corresponding to results of the corner detection of jagged edges after loading the template five times. In order to obtain enough points, a quality level in Shi-Tomasi corner detection algorithm is as small as possible. In the present embodiment, the quality level was 0.01, and a minimum Euclidean distance between the corners was set to 20, indicating that the minimum distance between the finally retained corners was 20 pixels. A neighborhood range specified when calculating a derivative autocorrelation matrix was 3. As can be seen from FIG. 11, a corner on an inclined straight line in a coordinate system cannot be found through the Shi-Tomasi corner detection.

Figure 12:
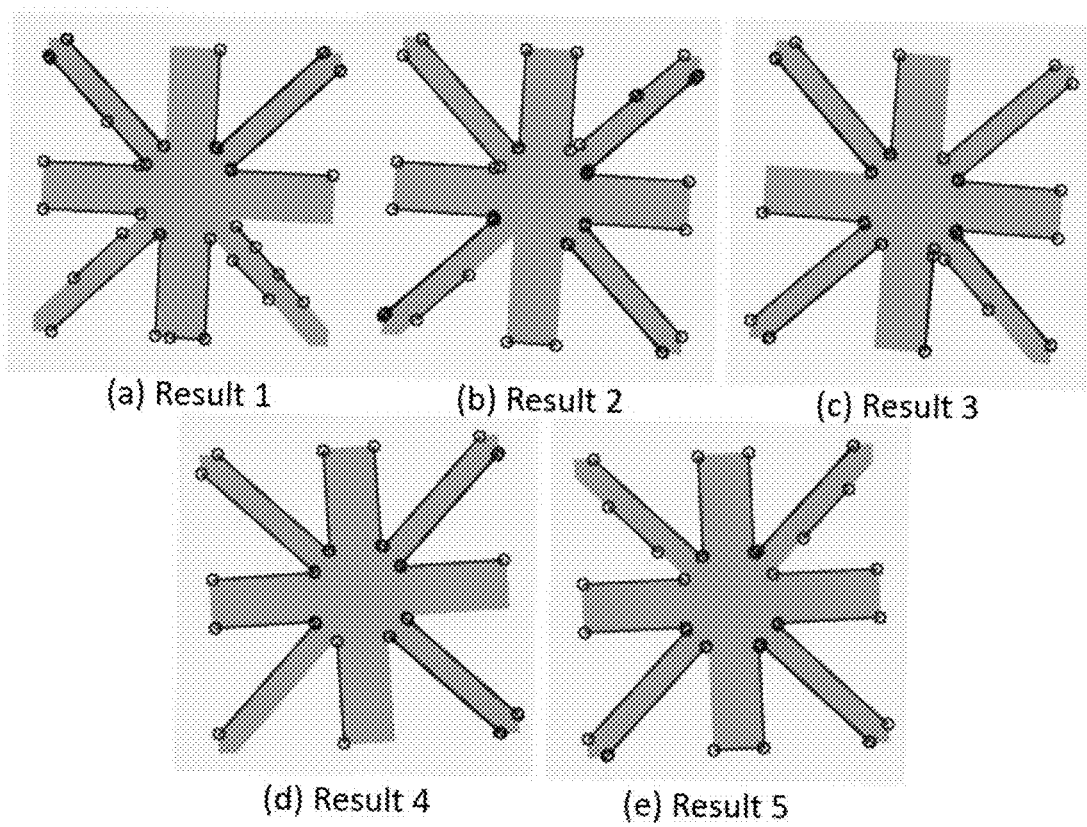
FIG. 12 schematically shows a diagram of results of edge detection and line detection performed on the binary image after loading the template five times according to Embodiment 1 of the present disclosure.

Step 14: Canny edge detection was performed on the binary image. In the present embodiment, since the "*" shape does not have curves or irregularly-shaped protrusions, and the image is simple and clean in structure, a first edge threshold selected was 1, a second edge threshold selected was 10. More edge information can be captured with relatively small thresholds. Progressive Probabilistic Hough Transform was performed on the image having undergone the Canny edge detection. In the present embodiment, a collinearity threshold selected was 80, i.e., in a polar coordinate system, if the number of curves intersecting at one point exceeded 80, then edge points in a Cartesian coordinate system corresponding to the more than 80 curves were considered as collinear, and these collinear edge points together formed edge straight lines. In addition, in order to avoid too many data, a minimum length of the edge line straights was set to be 50, and line segments shorter than this length were not retained or displayed. A Euclidean distance (a linear distance) allowing connection of two points was set as 10 pixels. A set of edge line segments from coarse detection $\{d_1, d_2, d_3, \ldots, d_n\}$ was obtained. Detection results of the coarse detection edge line segments are as shown in FIG. 12. In FIG. 12, (a)~(c) are respectively corresponding to results of Canny edge detection and line detection after loading the template five times.

Step 15: line segments in the set of edge line segments from coarse detection $\{d_1, d_2, d_3, \ldots, d_n\}$ obtained were traversed, and collinear line segments were merged into a set of collinear line segments from coarse detection, to obtain a set of collinear line segments from coarse detection $\{cl_1, cl_2, cl_3, \ldots cl_k\}$ Two line segments were arbitrarily selected from the set of edge line segments from coarse detection $\{d_1, d_2, d_3, \ldots, d_n\}$. It was known that endpoints of the two line segments were $(P_1, P_2)$ and $(P_3, P_4)$ respectively, the collinearity judgment conditions were $\Psi_1$ and $\Psi_2$, and the two line segments were determined collinear when the two conditions were both satisfied. $\Psi_1$ was whether an area of a quadrangle formed by the four endpoints was smaller than a first preset threshold. In the present disclosure, an area of a triangle was directly calculated through lengths of three sides of the triangle according to Heron's formula. $\Psi_2$ was whether a difference value between slope of one line segment and slope of line segment formed by connecting two endpoints of one line segment and two endpoints of the other line segment is smaller than a second preset threshold. In the present embodiment, the first preset threshold is $\eta=400$, and the second preset threshold is $\delta=0.16$.

Step 16: the corner set of jagged edges was traversed, point-line collinearity judgment was performed in the set of collinear line segments from coarse detection. Collinear corners and line segments were merged into the same set of collinear line segments from coarse detection, to obtain a set of point-line from fine detection $\{fl_1, fl_2, fl_3, \ldots fl_k\}$. In the above, a condition for judging the point-line collinearity was $\Psi_3$. $\Psi_3$ was whether an area of a triangle formed by a corner $sp_k$ and two endpoints $(P_i, P_j)$ of a line segment in the set of collinear line segments from coarse detection was smaller than a third preset threshold. In the present embodiment, the third preset threshold was $\eta_s=300$, and a calculation method of $\Psi_3$ was the same as the formula for calculating the area of the triangle in $\Psi_1$.

Step 17: linear fitting was performed on the corner and the corresponding line segment which were collinear in the fine detection point-line collinear set, for example, the linear fitting was performed using a least square method. A fitting result of fine detection point and line is as shown in FIG. 13.

Figure 13:
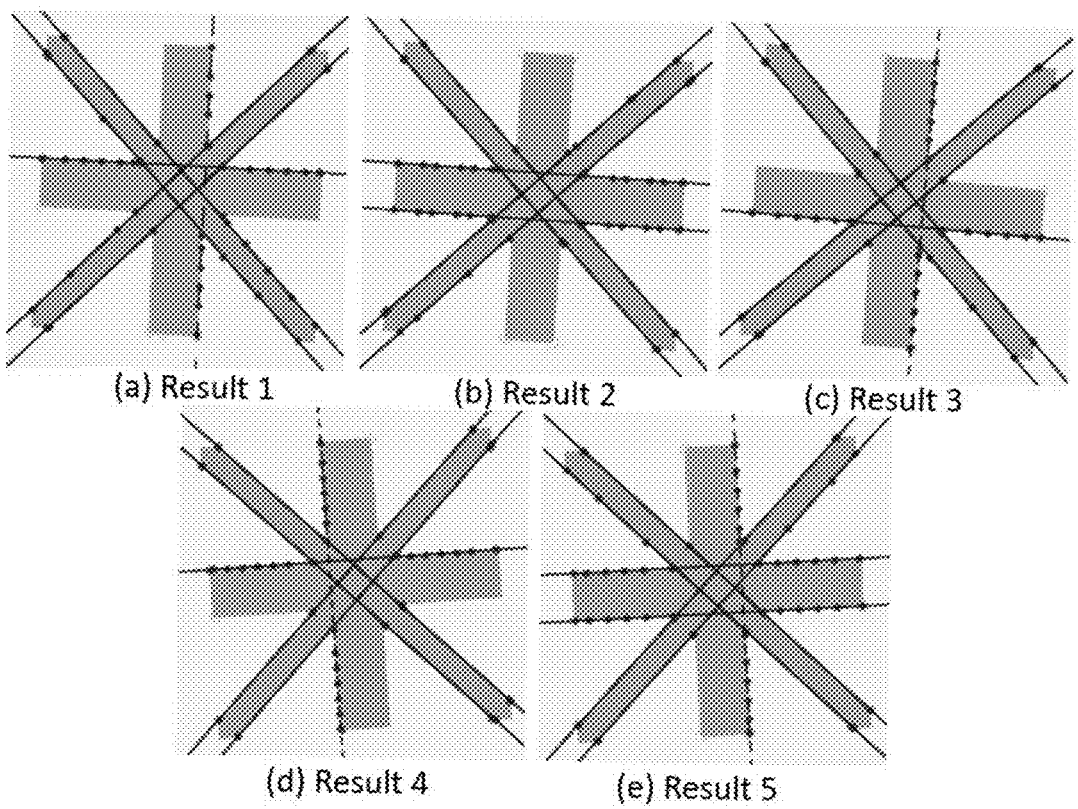
FIG. 13 schematically shows a diagram of results of linear fitting performed on a set of point-line from fine detection after loading the template five times according to Embodiment 1 of the present disclosure.

In FIG. 13, (a)~(c) are respectively corresponding to results of linear fitting of loading the template five times. A plurality of linear equations shaped like y=ax+b were respectively obtained for each image. An accurate straight line inclination angle β was obtained after arctan function calculation.

Step 18: this step was used to verify a detection deviation existing in the above detection method. A linear deviation angle was obtained by subtracting a detected inclination angle of each straight line from a standard angle (a desired angle after loading the template), the standard deflection angle was obtained by subtracting an inclination angle of each straight line at an actual loading position of the template from the standard angle (a desired angle after the template was loaded), therefore, detection error=standard deflection angle—deviation angle of straight line, and a deflection error was obtained by averaging the detection errors. The detection deviation of this method can be estimated according to the standard deviation and an average value of the deflection errors corresponding to the plurality of standard deflection angles. The detection error and the deflection error are as shown in Table 1. As can be seen from Table 1, the average value of the detection errors is just the deflection error.

TABLE 1

Deflection Error Detection Result (unit/°)

| | Detection Result | | | | |
|---|---|---|---|---|---|
| | Detection Result 1 | Detection Result 2 | Detection Result 3 | Detection Result 4 | Detection Result 5 |
| Detection Error | −0.07914 | −0.00998 | 0.03911 | 0.06938 | 0.01725 |
| | 0.04264 | −0.03658 | 0.01157 | −0.13329 | 0.01197 |
| | −0.00962 | −0.02496 | −0.02506 | 0.02386 | 0.05610 |
| | −0.02204 | −0.08726 | −0.00016 | 0.04926 | −0.10052 |
| | 0.02239 | 0.02080 | 0.03899 | 0.02782 | −0.01237 |
| | 0.00432 | 0.04635 | −0.08948 | 0.06773 | −0.06372 |
| | \ | \ | \ | \ | 0.02019 |
| Average Value (deflection error) | −0.00691 | −0.01527 | −0.00417 | 0.01746 | −0.01016 |

The detection deviation of this method can be estimated by calculating the average value of a plurality of detected deflection errors and the standard deviation, as shown in Table 2. It can be seen from Table 2 that the detection deviation of this method is [−0.00381±0.01259], which satisfies the requirement for accuracy of template transmission.

TABLE 2

Detection Accuracy

| | Deflection Error |
|---|---|
| 1 | −0.00691 |
| 2 | −0.01527 |
| 3 | −0.00417 |
| 4 | 0.01746 |
| 5 | −0.01016 |
| Average Value | −0.00381 |
| Standard Difference | 0.01259 |

After the inclination angles of various straight lines of the template mark were obtained according to the above method, the template can be corrected in angle according to the difference value of the mark offset from the standard angle, so that the template mark reaches a desired loading position, and thus the template reaches the desired loading position.

In conclusion, in the present disclosure, the collected image is converted into the gray scale image and is subjected to Blur filtering and binarization; then, the corner detection of jagged edges and line detection are carried out in parallel, the collinearity detection is carried out on the coarse detection line segments obtained, and the set of collinear line segments from coarse detection in which two or more line segments are collinear is retained; then the corner data are traversed, the point-line collinearity judgment is performed in the set of collinear line segments from coarse detection, and the collinear corners are merged, to obtain the set of point-line from fine detection; and finally, the linear fitting and inverse trigonometric function operation are performed on various set of point-line from fine detections to obtain more accurate straight line inclination angles, and the position of the template is corrected with high accuracy according to the difference value between the inclination angles of various straight lines and the standard angle.

The above embodiments further describe the objectives, the technical solutions, and the beneficial effects of the present disclosure in detail. It should be understood that the above-mentioned are merely for specific embodiments of the present disclosure, and are not intended to limit the present disclosure. Any amendments, equivalent replacements, improvements and so on made within the spirit and principle of the present disclosure should be covered within the scope of protection of the present disclosure.

What is claimed is:

1. A template mark detection method based on a single camera, comprising:
   S1, carrying out image collection on a mark on a template by a single camera, and obtaining a binary image after preprocessing;
   S2, carrying out corner detection of jagged edges on the binary image to obtain a corner set of jagged edges;
   S3, performing edge detection and line detection in sequence on the binary image to obtain a set of edge line segments from coarse detection;
   S4, traversing the set of edge line segments from coarse detection, and judging and retaining collinear line segments therein, to obtain a set of collinear line segments from coarse detection;
   S5, traversing the corner set of jagged edges, for point-line collinearity judgment with line segments in the set of collinear line segments from coarse detection, to obtain a set of point-line from fine detection; and
   S6, carrying out linear fitting on the set of point-line from fine detection, and calculating an inclination angle of each of straight lines through an arctan function, thus completing detection of the mark.

2. The template mark detection method based on a single camera according to claim 1, wherein the S1 comprises:
   S11, carrying out the image collection on the mark on the template by the single camera, to obtain an initial image;
   S12, converting the initial image into a gray scale image and filtering the gray scale image; and
   S13, performing binarization processing on an image obtained in the S12, to obtain the binary image.

3. The template mark detection method based on a single camera according to claim 1, wherein the S2 comprises:
  performing Shi-Tomasi corner response function detection on pixel points in the binary image, to obtain the corner set of jagged edges.

4. The template mark detection method based on a single camera according to claim 1, wherein the S3 comprises:
  performing Canny edge detection on the binary image to obtain an edge pattern; and
  obtaining a plurality of edge line segments in the mark using Progressive Probabilistic Hough Transform according to the edge pattern, wherein the plurality of edge line segments form the set of edge line segments from coarse detection.

5. The template mark detection method based on a single camera according to claim 1, wherein the S4 comprises:
  S41, arbitrarily selecting two line segments in the set of edge line segments from coarse detection, to obtain four endpoints;
  S42, calculating an area of a quadrangle formed by the four endpoints, and calculating a slope of one of the line segments, and slopes of line segments formed by connecting two endpoints of one line segment to two endpoints of the other line segment respectively;
  S43, when the area of the quadrangle is smaller than a first preset threshold and a difference value between slopes is smaller than a second preset threshold, the two line segments being collinear; and
  S44, traversing the set of edge line segments from coarse detection, and retaining the collinear line segments therein, to obtain the set of collinear line segments from coarse detection.

6. The template mark detection method based on a single camera according to claim 1, wherein the S5 comprises:
  S51, arbitrarily selecting a corner from the corner set of jagged edges, the corner forming triangles with the line segments in the set of collinear line segments from coarse detection respectively;
  S52, calculating areas of the triangles;
  S53, when the areas of the triangles are smaller than a third preset threshold, the corner being point-line collinear with the line segments; and
  S54, traversing the corner set of jagged edges, and merging point-line collinear corners and line segments to obtain the set of point-line from fine detection.

7. The template mark detection method based on a single camera according to claim 6, wherein the S5 further comprises:
  S55, selecting same collinear line segments in the set of point-line from fine detection, retaining any one thereof, and removing redundant line segments.

8. The template mark detection method based on a single camera according to claim 1, wherein the S6 comprises:
  S61, carrying out linear fitting on a corner and two endpoints of a corresponding line segment in the set of point-line from fine detection to obtain a linear equation, the corner and the corresponding line segment being collinear; and
  S62, calculating an inclination angle of each of the straight lines through the arctan function according to the linear equation.

9. The template mark detection method based on a single camera according to claim 1, wherein the mark on the template comprises one of a "*" shape and a cross shape.

10. A template position correction method based on a single camera, comprising:
  S1, carrying out image collection on a mark on a template by a single camera, and obtaining a binary image after preprocessing;
  S2, carrying out corner detection of jagged edges on the binary image to obtain a corner set of jagged edges;
  S3, performing edge detection and line detection in sequence on the binary image to obtain a set of edge line segments from coarse detection;
  S4, traversing the set of edge line segments from coarse detection, and judging and retaining collinear line segments therein, to obtain a set of collinear line segments from coarse detection;
  S5, traversing the corner set of jagged edges, for point-line collinearity judgment with line segments in the set of collinear line segments from coarse detection, to obtain a set of point-line from fine detection;
  S6, carrying out linear fitting on the set of point-line from fine detection, and calculating an inclination angle of each of straight lines through an arctan function; and
  S7, correcting a position of the template according to a difference value between the inclination angle of each of the straight lines and a standard angle.

* * * * *